(12) United States Patent
Kim et al.

(10) Patent No.: US 9,137,470 B2
(45) Date of Patent: Sep. 15, 2015

(54) DIGITAL IMAGE PROCESSING READOUT INTEGRATED CIRCUIT (ROIC) HAVING MULTIPLE SAMPLING CIRCUITS

(75) Inventors: Eun-Hwa Kim, Seoul (KR); Jin-Woong Jeong, Seoul (KR); Young-Jae Kim, Seoul (KR); Chol-Ho Kwak, Seoul (KR); Seul-Yi Soh, Langley (CA); Myung-Jin Soh, Langley (CA)

(73) Assignee: Luxen Technologies, Inc., Seoul (KR)

( * ) Notice: Subject to any disclaimer, the term of this patent is extended or adjusted under 35 U.S.C. 154(b) by 209 days.

(21) Appl. No.: 13/584,866

(22) Filed: Aug. 14, 2012

(65) Prior Publication Data
US 2014/0048682 A1 Feb. 20, 2014

(51) Int. Cl.
*H04N 5/378* (2011.01)

(52) U.S. Cl.
CPC .................... *H04N 5/378* (2013.01)

(58) Field of Classification Search
CPC ...................................... H04N 5/378
USPC ........................ 250/208.1, 370.09; 348/162
See application file for complete search history.

(56) References Cited

U.S. PATENT DOCUMENTS

| | | | |
|---|---|---|---|
| 6,111,606 A | 8/2000 | Ikeda | |
| 6,205,199 B1 | 3/2001 | Polichar et al. | |
| 6,323,490 B1 | 11/2001 | Ikeda et al. | |
| 7,271,392 B2 | 9/2007 | Ishii et al. | |
| 7,495,227 B2 | 2/2009 | Hennessy et al. | |
| 8,766,200 B2 | 7/2014 | Konkle et al. | |
| 2010/0001198 A1* | 1/2010 | Yagi et al. | 250/370.09 |
| 2012/0217413 A1* | 8/2012 | Kameshima et al. | 250/394 |

FOREIGN PATENT DOCUMENTS

| | | |
|---|---|---|
| WO | 2012036495 A2 | 3/2012 |
| WO | 2012036497 A2 | 3/2012 |

OTHER PUBLICATIONS

Application No. EP13168188.4, European Search Report, Nov. 5, 2013, 3 pages.
Pan, P. et al., "A High Performance 1024×1024 Digital X-ray Panel with Integrated Readout Electronics for Non-destructive Testing and Medical Imaging Applications", 5 pages. http://www.corebyindigo.com/files/Documents/IEEE_Nuclear_Science.pdf, 2007.
Beuville, E. et al., "High Performance, Low-Noise, 128-Channel Readout Integrated Circuit for Flat Panel X-ray Detector Systems", 12 pages. http://www.ipen.br/biblioteca/cd/ieee/2004/DATA/1N08-4.PDF, 2004. May, 2004.
Pan, P. et al., "A High Performance 1024×1024 Digital X-ray Panel with Integrated Readout Electronics for Non-destructive Testing and Medical Imaging Applications", 5 pages. http://www.corebyindigo.com/files/Documents/IEEE_Nuclear_Science.pdf, Nov. 21, 2007.

(Continued)

*Primary Examiner* — Tony Ko
(74) *Attorney, Agent, or Firm* — Madeline F. Schiesser; Keohane & D'Alessandro PLLC

(57) ABSTRACT

Embodiments of the present invention provide an approach for improving overall chip speed by providing one or more sampling circuits in an ROIC so that signal processing and signal reading out operations may occur simultaneously instead of successively.

19 Claims, 7 Drawing Sheets

(56) References Cited

OTHER PUBLICATIONS

Beuville, E et al., "High Performance, Low-Noise, 128-Channel Readout Integrated Circuit for Flat Panel X-ray Detector Systems", 12 pages. http://www.ipen.br/biblioteca/cd/ieee/2004/DATA/1N08-4.PDF, May, 2004.

Beuville, E. et al., "A High Performance, Low-noise 128-Channel Readout Integrated Circuit for Instrumentation and X-ray Applications", 2004 IEEE. 5 pages. http://www.corebyindigo.com/PDF/SPIE/SPIE_ISC9717_2004.pdf.

* cited by examiner

DIGITAL IMAGE PROCESSING READOUT INTEGRATED CIRCUIT (ROIC) HAVING MULTIPLE SAMPLING CIRCUITS

FIELD OF THE INVENTION

In general, embodiments of the present invention relate to readout integrated circuits (ROICs). Specifically embodiments of the present invention relate to ROICs having multiple sampling circuits for digital image processing (e.g., x-ray detectors).

BACKGROUND OF THE INVENTION

Digital image processing readout integrated circuits (ROICs) using a thin film transistor (TFT) panel may adopt an arrayed pixel architecture with multiple columns and rows. A gate control circuit may be provided and may select an individual pixel within the array. The selected pixel's output image signal may then be communicated to the signal processing unit. The image signal received by the signal processing unit may then require amplification before the actual signal processing takes place, for it is very small in magnitude and thus susceptible to noises issuing from a variety of sources. Challenges may exist, however, in that signal processing and readout/output operations typically occur successively in ROICs. Such an implementation results in slower speeds and reduces overall efficiency. Heretofore, attempts have been made in providing image-based integrated circuits.

U.S. Pat. No. 7,495,227 discloses an x-ray detector is provided for use in imaging systems. The x-ray detector includes a detector subsystem configured to output electrical signals in response to reception of x-rays. The detector subsystem includes an imaging panel, a support layer and a low density core disposed between the imaging panel and the support layer.

U.S. Pat. No. 6,323,490 discloses an X-ray semiconductor detector having a pixel array structure in which a plurality of pixel elements are arrayed in a matrix. Each pixel element includes an x-ray/charge conversion film for generating charges in accordance with an incident x-ray, a storage capacitor for storing the signal charges generated in the x-ray/charge conversion film, a signal read transistor for reading the signal charges from the storage capacitor, and a protective diode arranged to remove excessive charges from the storage capacitor and prevent dielectric breakdown of the signal read transistor.

U.S. Pat. No. 6,205,109 discloses a portable, self-contained, electronic radioscopic imaging system using a pulsed x-ray source, a remote X-ray sensor, and a self-contained, display and controller unit to produce, store, and/or display digital radioscopic images of an object under investigation.

Unfortunately, none of these attempts address the issues of the related art.

SUMMARY OF THE INVENTION

In general, embodiments of the present invention provide an approach for improving overall chip speed by providing one or more sampling circuits in an ROIC so that signal processing and signal reading out operations may occur simultaneously instead of successively. In one embodiment of the present invention, an ROIC may comprise: an amplifier configured to amplify a charge generated at a set of photo diodes and to convert a received signal associated with the set of photo diodes to a set of voltage signals based on a reference voltage (VREF); a filter configured to reduce (or eliminate) undesired high frequency noises from the set of voltage signals; a first sampling circuit configured to sample voltage signals before and sampling a set of incoming image signals to output sampling results (these operations also reduce low frequency noises and compensate for offset from the amplified signals); and/or a second sampling circuit configured to receive output from the first sampling circuit, to store the received output via a capacitor and a buffer, and to output the stored signals in accordance with a control signal.

A first aspect of the present invention provides a readout integrated circuit (ROIC), comprising: an amplifier circuit configured to amplify a charge generated at a set of photo diodes and to convert a received signal associated with the set of photo diodes to a set of voltage signals based on a reference voltage (VREF); a filter circuit coupled to the amplifier circuit, the filter being configured to reduce frequency noise from the set of voltage signals; a first sampling circuit coupled to the filter circuit, the first sampling circuit being configured to sample the set of voltage signals before and after sampling a set of incoming image signals and to output a set of sampling results; and a second sampling circuit coupled to the first sampling circuit, the second sampling circuit being configured to store the set of sampling results as received from the first sampling circuit.

A second aspect of the present invention provides a readout integrated circuit (ROIC) system, comprising: a first ROIC comprising a first amplifier coupled to a first filter and a first sampling circuit, the first ROIC being configured to process and read a received signal simultaneously; and a second ROIC coupled to the first ROIC, the second ROIC comprising a second amplifier coupled to a second filter and a second sampling circuit, the second ROIC also being configured to process and read the received signal simultaneously.

A third aspect of the present invention provides a method for processing a signal with a readout integrated circuit (ROIC) comprising: amplifying a charge generated at a set of photo diodes using an amplifier circuit configured to amplify a charge generated at a set of photo diodes; converting a received signal associated with the set of photo diodes to a set of voltage signals based on a reference voltage (VREF) using the amplifier circuit; reducing frequency noise from the set of voltage signals using a filter coupled to the amplifier circuit; sampling the set of voltage signals before and after sampling a set of incoming image signals using a first sampling circuit coupled to the filter circuit; outputting a set of sampling results from the first sampling circuit; and storing the set of sampling results as received from the first sampling circuit using a second sampling circuit coupled to the first sampling circuit.

BRIEF DESCRIPTION OF THE DRAWINGS

These and other features of this invention will be more readily understood from the following detailed description of the various aspects of the invention taken in conjunction with the accompanying drawings in which.

Figure 1:
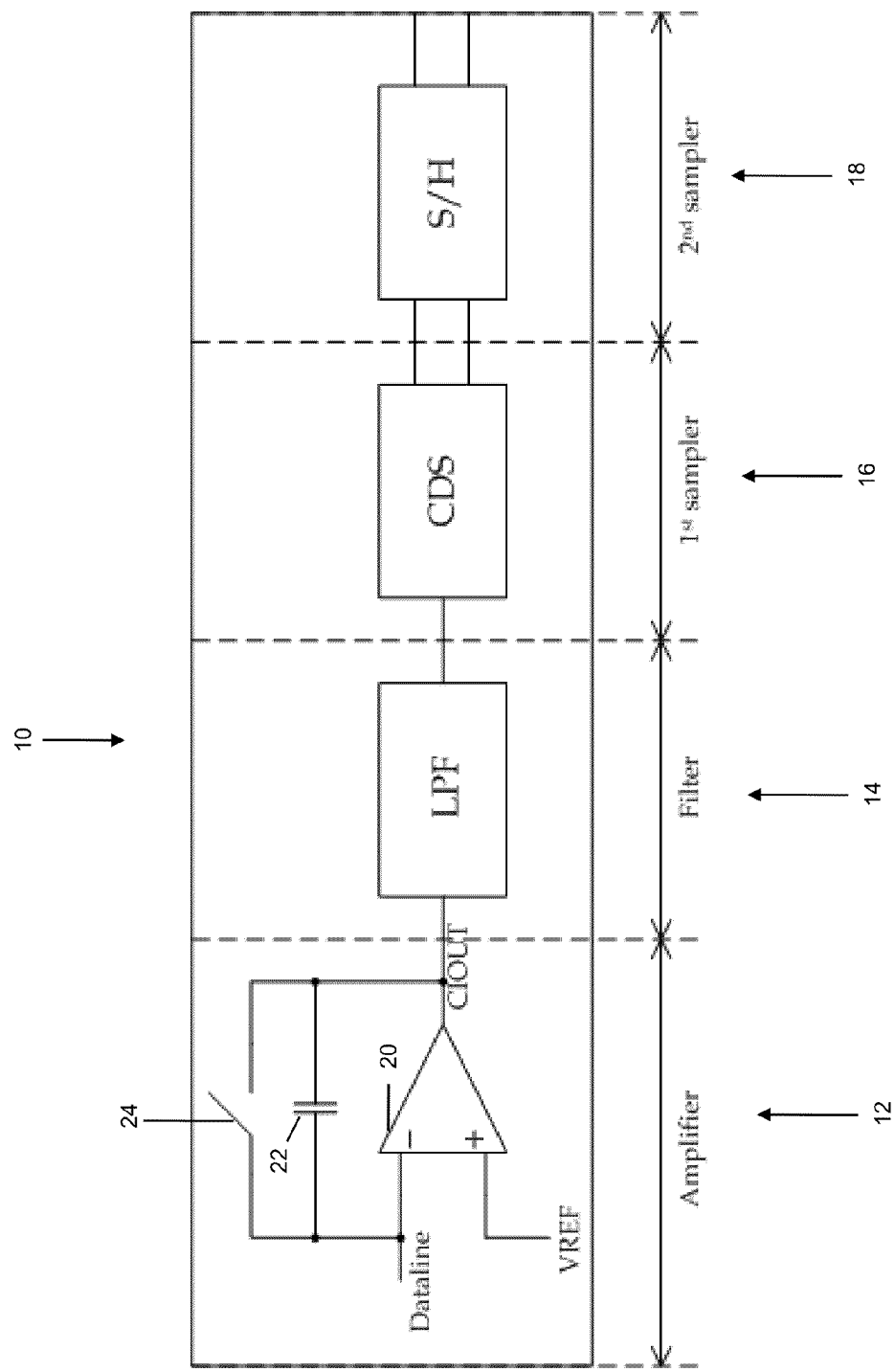
FIG. 1 shows a schematic of a digital x-ray imaging ROIC with a double sampling circuit structure according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The word "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide an approach for improving overall chip speed by providing one or more sampling circuits in an ROIC so that signal processing and signal reading out operations may occur simultaneously instead of successively. In one embodiment of the present invention, an ROIC may comprise: an amplifier configured to amplify a charge generated at a set of photo diodes and to convert a received signal associated with the set of photo diodes to a set of voltage signals based on a reference voltage (VREF); a filter configured to reduce (or eliminate) undesired high frequency noises from the set of voltage signals; a first sampling circuit configured to sample voltage signals before and sampling a set of incoming image signals to output sampling results (these operations also reduce low frequency noises and compensate for offset from the amplified signals); and/or a second sampling circuit configured to receive output from the first sampling circuit, to store the received output via a capacitor and a buffer, and to output the stored signals in accordance with a control signal.

Along these lines, embodiments of the present invention will utilize components such as amplifiers, filters, sampling circuits/samplers, etc. The following section will describe and/or define such components.

A readout integrated circuit (ROIC) is an electrical circuit multiplexer that mechanically and electrically interfaces or couples to a focal plane array (FPA) sensor/detector serving to function as a voltage buffer which measures or reads individual FPA outputs (sensor data or information) that are driven by incident electromagnetic energy on each and every individual input FPA unit cell or detector and transforms or transmits the sensor data to external electronics. The main function of an infrared readout circuit is to transform a very small diode incremental current, generated by infrared radiation, into a relatively large measurable output voltage. This is commonly done by integrating the photocurrent in a small capacitor during a fixed period of time. The capacitor's voltage at the end of the integration period should be proportional to the current and, as such, to the incident infrared radiation of a pixel corresponding to the location of the infrared diode photo sensor. Infrared imagers consist of linear or two dimensional arrays including a very large number of infrared photo sensors.

These arrays are denoted linear or focal plane arrays. Given that in the most general case each pixel of an image requires an individual readout circuit, the electronics associated to an infrared imager consists of a very large number (thousands) of readout circuits. Readout electronics are implemented as very large scale application specific integrated circuits or application specific integrated circuits (ASIC) in complementary metal-oxide semiconductor (CMOS) technology. Due to the fact that infrared imagers can have several thousand unit cells, the unit cell is required to be very compact, to have very low power dissipation and at the same time to have high performance characteristics.

A typical FPA may be composed of 512 columns by 512 rows of individual (assuming no crosstalk) unit cells or pixels having a physical size of 30 um by 30 um which define the image frame of the electromagnetic energy incident on the surface. The function of the ROIC is to scan the 512 by 512 array, not unlike a raster scan, in such a way as to synchronously read and bring together in a formatted way all the pixel outputs from the FPA into an appropriate lower impedance electrical circuit for video transmission and processing. Each unit cell detector output responds (gain) limited range of wavelengths of the electromagnetic energy incident upon the input, thereby defining the image as infrared, visible, x-ray, etc. The ROIC inputs are composed of a source follower FET topology (voltage buffer) such as to transform large unit cell output impedance to low input impedance to drive a transmission via (several hundreds of pF) of the unit cell output response. Each unit cell is given a fixed amount of time (integration time) to sample the incident electromagnetic energy before the readout, not unlike a sample and hold circuit.

The interface of the readout to the array is composed of hybridized indium dots for each and every unit cell-to-source follower interface. For example, GaN detector arrays are hybridized to a Si ROIC using flip chip bonding technology. Scanning the array can be done in various ways. Several methods exist, including: snapshot, fowler, and sampling up the ramp. Integration and readout modes include integrate-while-read and integrate-then-read.

The opposite use of a ROIC is the read-in integrated circuit (RIIC), which is used to produce or simulate images in a focal plane array. The analogous image system using a RIIC for image simulation is the television image process. Image simulation is used for hardware-in-the-loop (HIL) testing purposes. Sampling can be done for functions varying in space, time, or any other dimension, and similar results are obtained in two or more dimensions. For functions that vary with time, let s(t) be a continuous function (or "signal") to be sampled, and let sampling be performed by measuring the value of the continuous function every T seconds, which is called the sampling interval. Thus, the sampled function is given by the sequence:

s(nT), for integer values of n.

The sampling frequency or sampling rate $f_s$ is defined as the number of samples obtained in one second (samples per second), thus:

$f_s=1/T$

Reconstructing a continuous function from samples is done by interpolation algorithms. The Whittaker-Shannon interpolation formula is mathematically equivalent to an ideal low pass filter whose input is a sequence of Dirac delta functions that are modulated (multiplied) by the sample values. When the time interval between adjacent samples is a constant (T), the sequence of delta functions is called a Dirac comb. Mathematically, the modulated Dirac comb is equivalent to the product of the comb function with s(t). That purely mathematical function is often loosely referred to as the sampled signal. Most sampled signals are not simply stored and reconstructed. But the fidelity of a theoretical reconstruction is a customary measure of the effectiveness of sampling. That fidelity is reduced when s(t) contains frequency components higher than $f_s/2$ Hz, which is known as the Nyquist frequency of the sampler. Therefore s(t) is usually the output of a low pass filter, functionally known as an "anti-aliasing" filter. Without an anti-aliasing filter, frequencies higher than the Nyquist frequency will influence the samples in a way that is misinterpreted by the interpolation process.

As will be further described, a low-pass filter is an electronic filter that passes low-frequency signals but attenuates (e.g., reduces the amplitude of) signals with frequencies higher than the cutoff frequency. The actual amount of attenuation for each frequency varies from filter to filter. It is sometimes called a high-cut filter, or treble cut filter when used in audio applications. A low-pass filter is the opposite of a high-pass filter. A band-pass filter is a combination of a low-pass and a high-pass.

Low-pass filters exist in many different forms, including electronic circuits (such as a hiss filter used in audio), anti-aliasing filters for conditioning signals prior to analog-to-digital conversion, digital filters for smoothing sets of data, acoustic barriers, blurring of images, and so on. The moving average operation used in fields such as finance is a particular kind of low-pass filter, and can be analyzed with the same signal processing techniques as are used for other low-pass filters. Low-pass filters provide a smoother form of a signal, removing the short-term fluctuations, and leaving the longer-term trend.

An optical filter could correctly be called low-pass, but conventionally is described as "long pass" (low frequency is long wavelength), to avoid confusion. An ideal low-pass filter completely eliminates all frequencies above the cutoff frequency while passing those below unchanged: its frequency response is a rectangular function and is a brick-wall filter. The transition region present in practical filters does not exist in an ideal filter. An ideal low-pass filter can be realized mathematically (theoretically) by multiplying a signal by the rectangular function in the frequency domain or, equivalently, convolution with its impulse response, a sinc function, in the time domain.

However, the ideal filter is impossible to realize without also having signals of infinite extent in time, and so generally needs to be approximated for real ongoing signals, because the sinc function's support region extends to all past and future times. The filter would therefore need to have infinite delay, or knowledge of the infinite future and past, in order to perform the convolution. It is effectively realizable for pre-recorded digital signals by assuming extensions of zero into the past and future, or more typically by making the signal repetitive and using Fourier analysis.

Real filters for real-time applications approximate the ideal filter by truncating and windowing the infinite impulse response to make a finite impulse response. Applying that filter requires delaying the signal for a moderate period of time, allowing the computation to "see" a little bit into the future. This delay is manifested as phase shift. Greater accuracy in approximation requires a longer delay.

An ideal low-pass filter results in ringing artifacts via the Gibbs phenomenon. These can be reduced or worsened by choice of windowing function, and the design and choice of real filters involves understanding and minimizing these artifacts. For example, "simple truncation [of sinc] causes severe ringing artifacts," in signal reconstruction, and to reduce these artifacts one uses window functions "which drop off more smoothly at the edges". The Whittaker-Shannon interpolation formula describes how to use a perfect low-pass filter to reconstruct a continuous signal from a sampled digital signal. Real digital-to-analog converters use real filter approximations.

One simple electrical circuit that will serve as a low-pass filter consists of a resistor in series with a load, and a capacitor in parallel with the load. The capacitor exhibits reactance and blocks low-frequency signals, causing them to go through the load instead. At higher frequencies, the reactance drops, and the capacitor effectively functions as a short circuit. The combination of resistance and capacitance gives you the time constant of the filter:

τ=RC(represented by the Greek letter tau).

The break frequency, also called the turnover frequency or cutoff frequency (in hertz), is determined by the time constant:

$$f_c = \frac{1}{2\pi\tau} = \frac{1}{2\pi RC}$$

or equivalently (in radians per second):

$$\omega_c = \frac{1}{\tau} = \frac{1}{RC}.$$

One way to understand this circuit is to focus on the time the capacitor takes to charge. It takes time to charge or discharge the capacitor through that resistor: At low frequencies, there is plenty of time for the capacitor to charge up to practically the same voltage as the input voltage.

At high frequencies, the capacitor only has time to charge up a small amount before the input switches direction. The output goes up and down only a small fraction of the amount the input goes up and down. At double the frequency, there's only time for it to charge up half the amount. Another way to understand this circuit is with the idea of reactance at a particular frequency.

Since DC cannot flow through the capacitor, DC input must "flow out" the path marked $V_{out}$ (analogous to removing the capacitor). Moreover, since AC flows very well through the capacitor (e.g., almost as well as it flows through solid wire), AC input "flows out" through the capacitor, effectively short circuiting to ground (analogous to replacing the capacitor with just a wire). The capacitor is not an "on/off" object (like the block or pass fluidic explanation above). The capacitor will variably act between these two extremes. It is the Bode plot and frequency response that show this variability.

Correlated double sampling (CDS) is a method to measure electrical values such as voltages or currents that allows removing an undesired offset. It is used often when measuring sensor outputs. The output of the sensor is measured twice: once in a known condition and once in an unknown condition. The value measured from the known condition is then subtracted from the unknown condition to generate a value with a known relation to the physical quantity being measured.

This is commonly used in switched capacitor operational amplifiers to effectively double the gain of the charge sharing operational amplifier (op-amp), while adding an extra phase. When used in imagers, correlated double sampling is a noise reduction technique in which the Reference Voltage of the pixel (i.e., the pixel's voltage after it is reset) is removed from the Signal Voltage of the pixel (i.e., the pixel's voltage at the end of integration) at the end of each integration period.

In electronics, a sample and hold (S/H, also "follow-and-hold"[1]) circuit is an analog device that samples (captures, grabs) the voltage of a continuously varying analog signal and holds (locks, freezes) its value at a constant level for a specified minimal period of time. Sample and hold circuits and related peak detectors are the elementary analog memory devices. They are typically used in analog-to-digital converters to eliminate variations in input signal that can corrupt the conversion process.

A typical sample and hold circuit stores electric charge in a capacitor and contains at least one fast FET switch and at least one operational amplifier. To sample the input signal, the switch connects the capacitor to the output of a buffer amplifier. The buffer amplifier charges or discharges the capacitor so that the voltage across the capacitor is practically equal, or proportional to, input voltage. In hold mode, the switch disconnects the capacitor from the buffer. The capacitor is invariably discharged by its own leakage currents and useful load currents, which makes the circuit inherently volatile, but the loss of voltage (voltage drop) within a specified hold time remains within an acceptable error margin. In the context of LCD screens, it is used to describe when a screen samples the input signal, and the frame is held there without redrawing it. This does not allow the eye to refresh and leads to blurring during motion sequences, also the transition is visible between frames because the backlight is constantly illuminated, adding to blurring.

Referring now to FIG. 1, a ROIC 10 is depicted. AS shown, ROIC 10 generally comprises an amplifier circuit 12, which amplifies charge generated at photo diodes and converts such signals to voltage signals based on a reference voltage (VREF); a filter 14 (e.g., low pass filter) that reduces or eliminates undesired high frequency noises from the signals; a first sampling circuit 16 (e.g., a correlated double sampling circuit) that samples signals before and after incoming image signals and outputs the result, and also reduces low frequency noises and compensates offset from the amplified signals; a second sampling circuit 18 (e.g., a sampling and hold circuit) that receives output from the first sampling circuit and holes them via capacitor and buffer, and outputs the held signals in accordance with a control signal. As further shown, amplifier circuit 12 may comprise an amplifier 20 coupled to a capacitor 22 and a switch 24.

Figure 2:
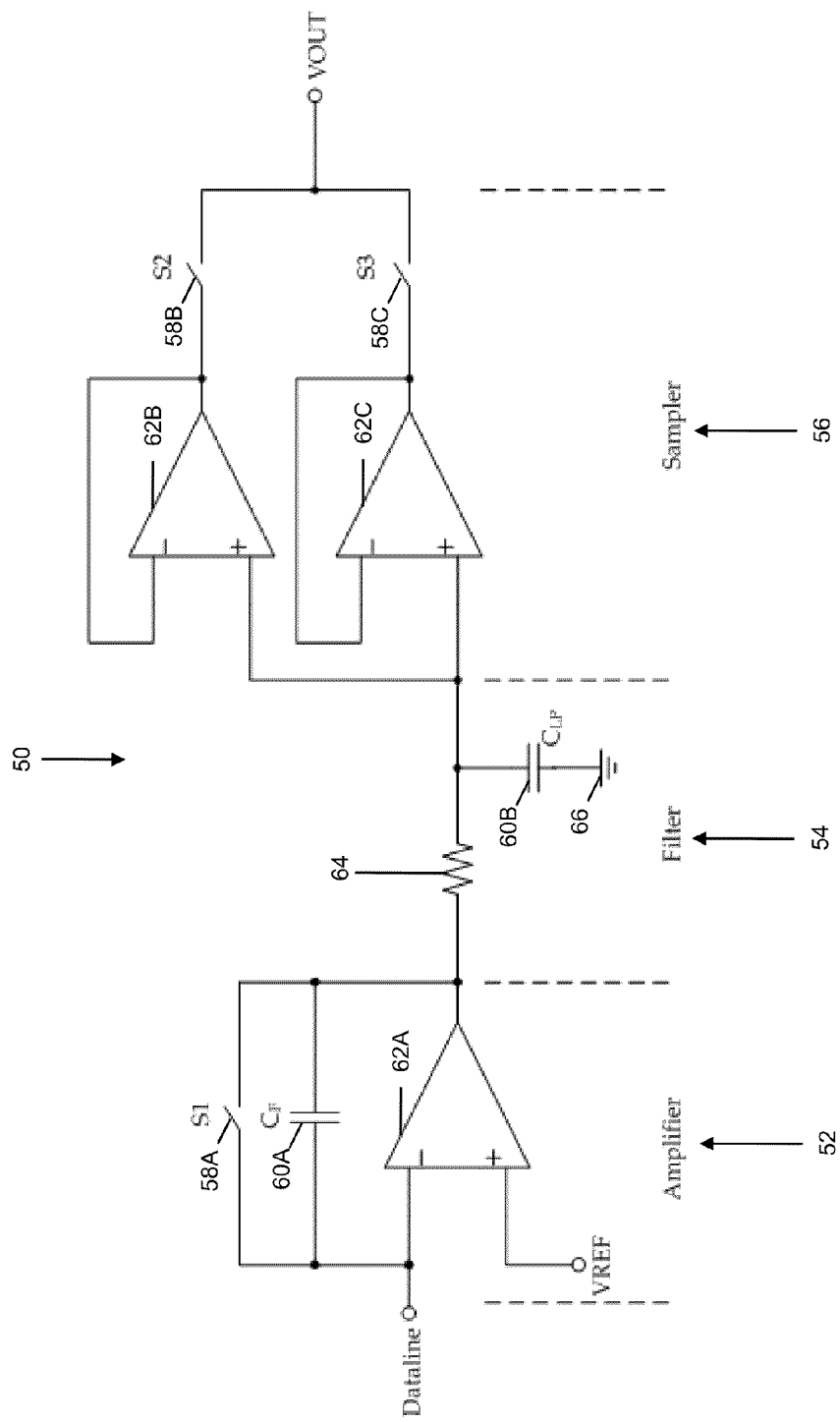
FIG. 2 shows a conventional x-ray imaging ROIC.

Referring now to FIG. 2, a ROIC 50 is shown that comprises: an amplifier circuit 52 (having an amplifier 62A coupled to a capacitor 60A, and a switch 58A), that amplifies an initial signal coming through a data line; a noise filter circuit 54 (having a resistor 64 coupled to a capacitor 60B and a ground 66) that filters out high frequency noise from an incoming signal; and a sampling circuit 56 (having amplifiers 62B-C coupled to switches 58B-C as shown) that produces an output signal after sampling the noise-free amplified signal.

Figure 3:
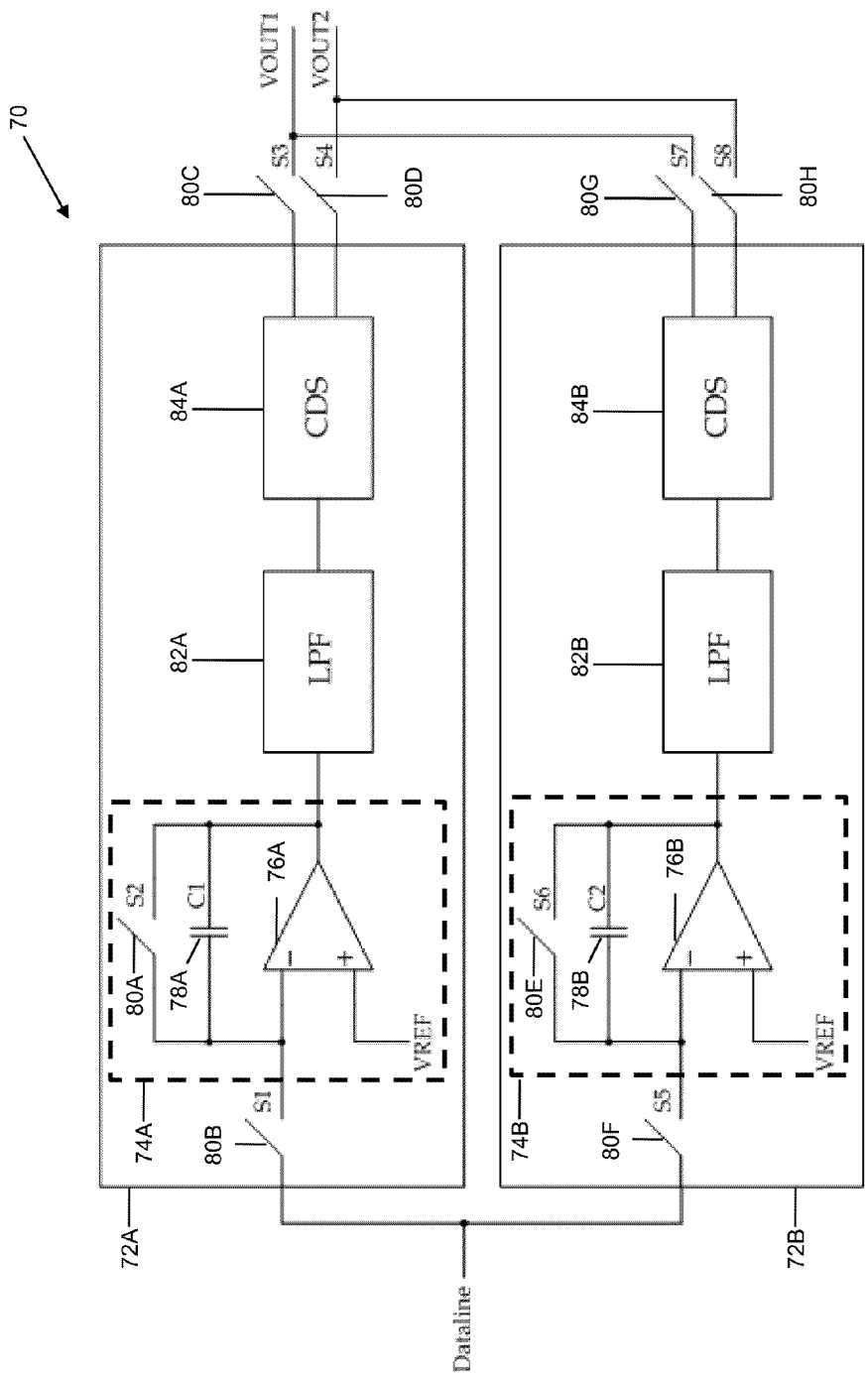
FIG. 3 shows an x-ray imaging ROIC for simultaneous signal processing and reading out by adopting a structure of two individual circuits shown in FIG. 2 to an embodiment of the present invention.

Referring now to FIG. 3, another embodiment of an improved ROIC design is depicted. As shown, the ROIC may comprise two sets of individual circuits 72A-B connected in parallel. Each circuit 72A-B may comprise an amplifier circuit 74A-B (each having an amplifier 76A-B, a capacitor 78A-B, and a switch 80A and 80E), coupled to a low pass filter 82A-B which themselves are coupled to a correlated double sampling circuit 84A-B. Circuits 72A-B are further shown coupled to switches 80C-D and 80G-H. It is understood that switches 80A-H are also referred to in FIG. 3 as S1-S8.

In general, ROIC 70 receives a next incoming image signal for processing. A charge signal is received by either of the individual set of circuits 72A-B as switches S1 and S5 open or close. The switch operation may be determined by an external control signal. For example, the charge signal may be processed in the first set of circuits as the switch S1 turns on. The control signal controls the switches S3, S4, S7, and S8 as well.

When the switch S1 is turned on, the switches S7 and S8 turn on as well. When the switch S5 is turned on, the switches S3 and S4 turn on. As the signal processing is done in the first circuit 72A, the switch S1 turns off and the switch S5 turns on to process next incoming signal. The switches S3 and S4 are turned on to output the first processed signal. Thus, the signal processing and reading out operation occurs simultaneously in two individual sets of circuits 72A-B, which enables the whole system to produce output continuously.

Figure 4:
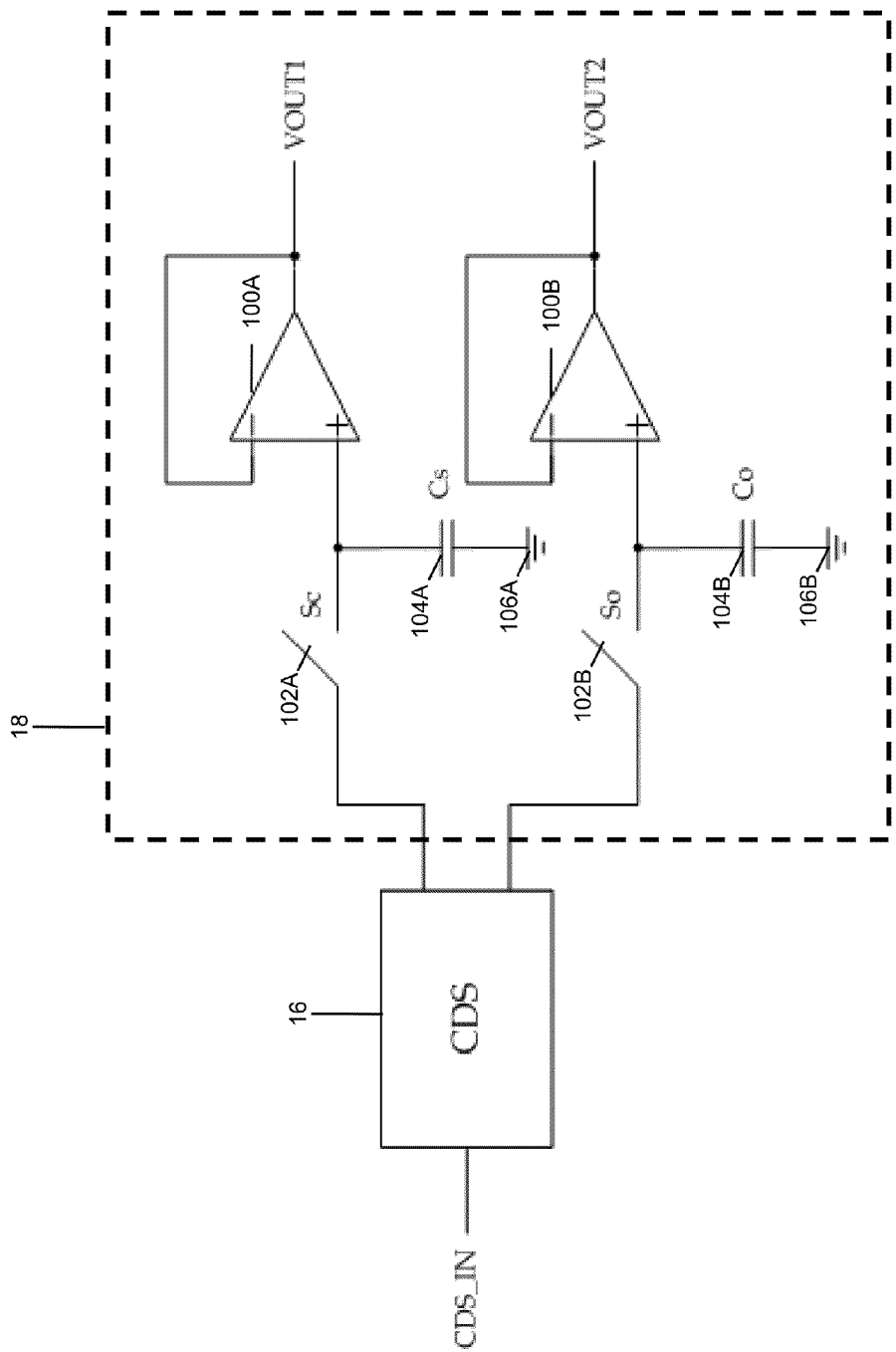
FIG. 4 shows a detailed schematic of the sampling circuit from FIG. 1 to an embodiment of the present invention.

FIG. 4 depicts a detailed schematic diagram of the second sampling circuit 18 (S/H) from FIG. 1, which has advantages in sizing and in technical implementation. As depicted, sampling circuit 18 receives a signal from sampling circuit 16 (CDS). Moreover, sampling circuit 16 typically comprises multiple sets of sampling logic 102A-B each comprising an amplifier 100A-B, switches 102A-B (also shown as Sc and So), capacitors 104A-B (also shown as Cs and Co) and grounds 106A-B. As can be seen, sampling circuit 18 may include capacitors and buffers. As sampling circuit 16 produces an output signal, switches Sc and So are turned off, which disconnects sampling circuit 18 from the rest of the circuit 10 (FIG. 1). As a control signal engages switches Sc and So, the signal flows to the buffer to be read out. During the readout process, the switches Sc and So are turned off again, and the output signal maintains its state as the capacitors 104A-B hold equivalent charge. While reading out the signal, the rest of the circuit receives and processes new image signals.

Figure 5:
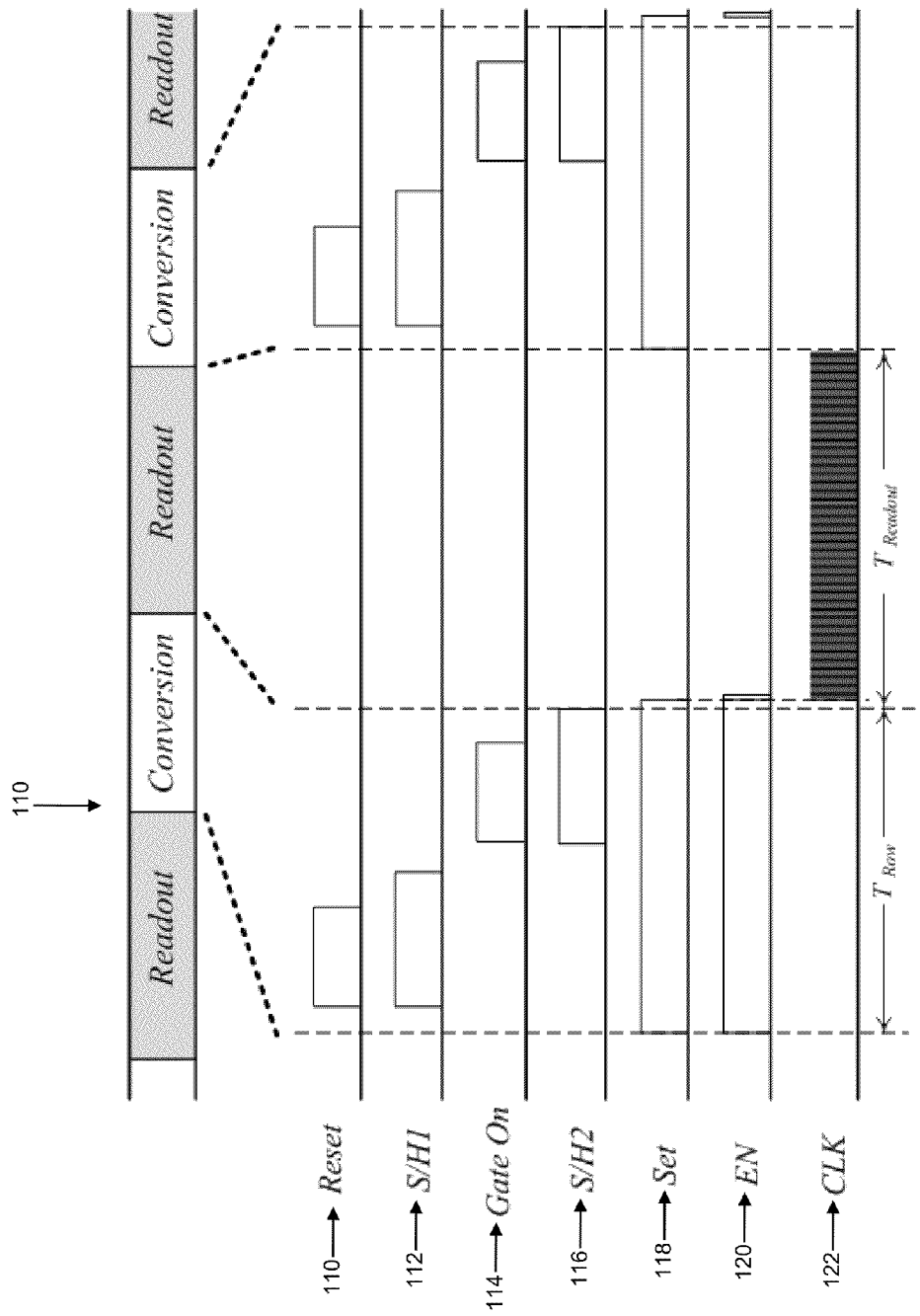
FIG. 5 shows a signal processing timing diagram for a conventional ROIC to an embodiment of the present invention.

Referring to FIG. 5, a signal processing timing diagram 110 for a ROIC according to an embodiment of the present invention is shown. Under diagram 110, a sampling circuit 112 samples an initial signal right after a reset 110 of the amplifier. Signal processing operations engage 114 as signals continue to flow into the circuit, and another sampling 116 of the signals takes place. The sampling circuit outputs analog signals based on the difference between the first sampled signal and the second, and the output analog buffers prevent signal loss during the operation. The main clock signal activates when the set signal 118 is "low," and the reading out begins as the enable signal EN 120 is introduced. The analog signals from each of the pixels are synchronized to the main clock 122 and read out to the external ROIC.

Figure 6:
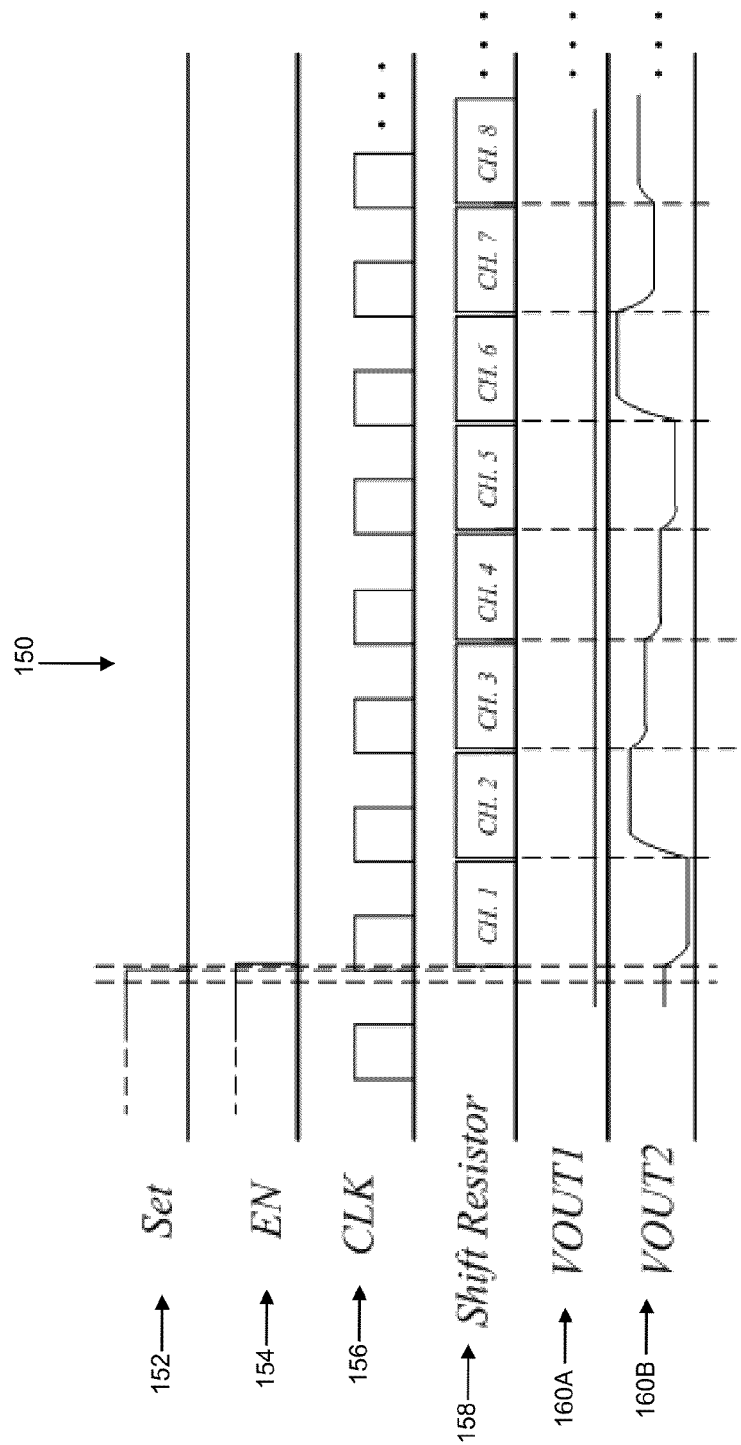
FIG. 6 shows a clock signal from FIG. 5 to an embodiment of the present invention.

Referring to FIG. 6, a clock signal 150 according to an embodiment of the present invention is shown. As depicted, the set signal 152 becomes "low," and the enable signal EN 154 becomes "low" as well after the ½ clock duration 156, to enable a shift register 158 within the ROIC. The signal processing and data reading out operations 160A-B occur one after the other.

Figure 7:
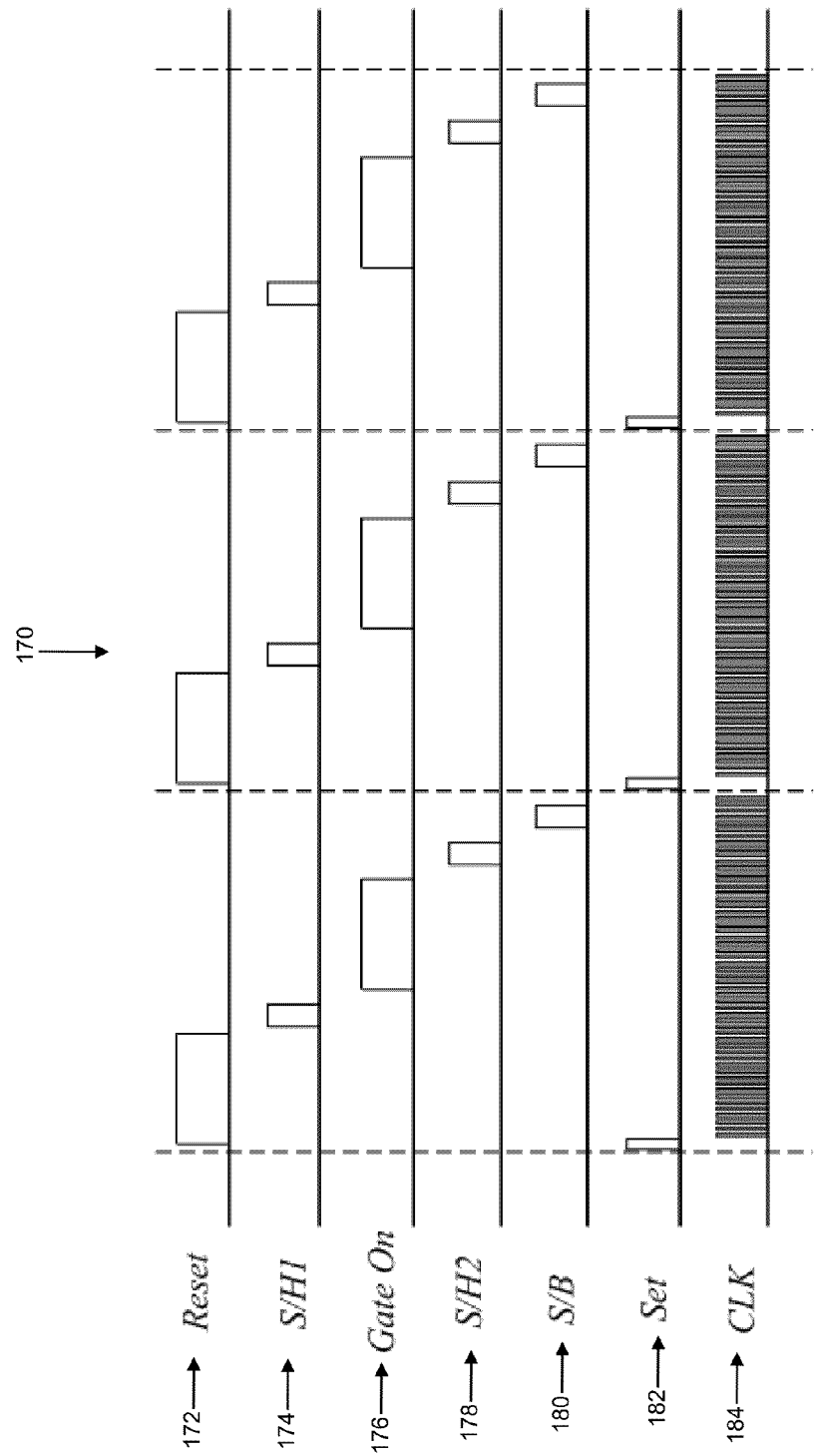
FIG. 7 shows a signal processing timing diagram to an embodiment of the present invention.

Referring to FIG. 7, a signal processing timing 170 diagram according to an embodiment of the present invention is shown (e.g., as produced by ROIC implementations of the present invention shown and described above). As depicted, the sampling 174 of the initial signal takes place after a reset 172 of the amplifier. After the initial sampling, a second sampling 178 of the incoming charge signal (when the gate is engaged 176) takes place. Each of the sampled signals is transferred to the second sampling circuit controlled by an external control signal S/B 180. The signals are read out in accordance with the main clock after a set signal 182 engaged, which resets the amplifier for the next sampling operation. The main clock 184 cycles as shown. The ROIC of the present invention can thus produce output continuously and speed up the whole process without having to perform signal processing and reading out operations one after the other, making it suitable for dynamic x-ray imaging applications as well as faster still imaging with higher resolution.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A readout integrated circuit (ROIC), comprising:
   an amplifier circuit configured to amplify a charge generated at a set of photo diodes and to convert a received signal associated with the set of photo diodes to a set of voltage signals based on a reference voltage (VREF);
   a filter circuit coupled to the amplifier circuit, the filter being configured to reduce frequency noise from the set of voltage signals;
   a first sampling circuit coupled to the filter circuit, the first sampling circuit being configured to sample the set of voltage signals before and after sampling a set of incoming image signals and to output a set of sampling results;
   a second sampling circuit coupled to the first sampling circuit, the second sampling circuit being configured to store the set of sampling results as received from the first sampling circuit;
   a first set of logic comprising a first amplifier coupled to a first capacitor and a first switch; and
   a second set of logic comprising a second amplifier coupled to a second capacitor and a second switch, the first set of logic and the second set of logic both being configured to receive a set of sampling results from the first sampling circuit.

2. The ROIC of claim 1, the second sampling circuit being further configured to output the set of sampling results in accordance with a control signal.

3. The ROIC of claim 1, the set of sampling results being stored by the second sampling circuits via a capacitor and a buffer.

4. The ROIC of claim 1, the amplifier circuit comprising an amplifier being coupled to a capacitor and a switch.

5. The ROIC of claim 1, the filter circuit comprising a low pass filter.

6. The ROIC of claim 1, the first sampling circuit comprising a correlated double sampling circuit.

7. The ROIC of claim 1, the second sampling circuit comprising a sampling and hold sampling circuit.

8. A readout integrated circuit (ROIC) system, comprising:
   a first ROIC comprising a first amplifier coupled to a first filter and a first sampling circuit, the first ROIC being configured to process and read a received signal simultaneously;
   a second ROIC coupled to the first ROIC, the second ROIC comprising a second amplifier coupled to a second filter and a second sampling circuit, the second ROIC also being configured to process and read the received signal simultaneously;
   a first set of logic comprising a third amplifier coupled to a first capacitor and a first switch; and
   a second set of logic comprising a fourth amplifier coupled to a second capacitor and a second switch, the first set of logic and the second set of logic both being configured to receive a set of sampling results from the first sampling circuit.

9. The ROIC system of claim 8, the first amplifier and the second amplifier each being configured to amplify a charge generated at a set of photo diodes and to convert a received signal associated with the set of photo diodes to a set of voltage signals based on a reference voltage (VREF).

10. The ROIC system of claim 8, the first filter circuit and the second filter circuit each being configured to reduce frequency noise from the set of voltage signals.

11. The ROIC system of claim 8, the first sampling circuit being configured to sample the set of voltage signals before and after sampling a set of incoming image signals, and to output a set of sampling results.

12. The ROIC system of claim 11, the second sampling circuit being configured to store the set of sampling results as received from the first sampling circuit.

13. The ROIC system of claim 8, the first sampling circuit and the second sampling circuit each comprising a correlated double sampling circuit.

14. The ROIC system of claim 8, the first ROIC and the second ROIC each being coupled to a plurality of switches.

15. The ROIC system of claim 8, the first ROIC and the second ROIC each receiving a data line.

16. A method for processing a signal with a readout integrated circuit (ROIC), comprising:
   amplifying a charge generated at a set of photo diodes using an amplifier circuit configured to amplify a charge generated at a set of photo diodes;
   converting a received signal associated with the set of photo diodes to a set of voltage signals based on a reference voltage (VREF) using the amplifier circuit;
   reducing frequency noise from the set of voltage signals using a filter coupled to the amplifier circuit;
   sampling the set of voltage signals before and after sampling a set of incoming image signals using a first sampling circuit coupled to the filter circuit;
   outputting a set of sampling results from the first sampling circuit;
   storing the set of sampling results as received from the first sampling circuit using a second sampling circuit coupled to the first sampling circuit;
   providing a first set of logic comprising a first amplifier of the logic coupled to a first capacitor and a first switch; and
   providing a second set of logic comprising a second amplifier of the logic coupled to a second capacitor and a second switch, the first set of logic and the second set of logic both being configured to receive a set of sampling results from the first sampling circuit.

17. The method of claim 16, further comprising outputting the set of sampling from the second sampling circuits in accordance with a control signal.

18. The method of claim 16, further comprising storing the set of sampling results using a capacitor and a buffer.

19. The method of claim 16, the filter circuit comprising a low pass filter and the first sampling circuit comprising a correlated double sampling circuit.

* * * * *